United States Patent [19]
Joun

[11] Patent Number: 5,800,236
[45] Date of Patent: Sep. 1, 1998

[54] TOY CASTING CARD HAVING A CONCAVE OR CONVEX LENS

[75] Inventor: Davie Joun, Taipei, Taiwan

[73] Assignee: Kudos Finder Trading Co., Ltd., Taipei, Taiwan

[21] Appl. No.: 951,227

[22] Filed: Oct. 16, 1997

[51] Int. Cl.$^6$ .................................................. A63B 65/10
[52] U.S. Cl. ........................ 446/46; 446/36; 446/71; 446/219
[58] Field of Search ......................... 446/36, 38, 39, 446/46, 48, 71, 219, 47

[56] References Cited

U.S. PATENT DOCUMENTS

| | | |
|---|---|---|
| 3,535,817 | 10/1970 | Fischer .................................. 446/219 |
| 3,959,915 | 6/1976 | Kettlestrings .......................... 446/46 |
| 4,203,249 | 5/1980 | Bohm ..................................... 446/48 |
| 4,354,326 | 10/1982 | Mathews ............................... 446/46 |
| 5,351,967 | 10/1994 | Yang ...................................... 446/46 |
| 5,536,195 | 7/1996 | Stamos ................................... 446/219 |
| 5,672,087 | 9/1997 | De La Paz Rizo et al. ........... 446/46 |

*Primary Examiner*—Robert A. Hafer
*Assistant Examiner*—Jeffrey D. Carlson
*Attorney, Agent, or Firm*—Bacon & Thomas

[57] ABSTRACT

An improved toy casting card can be better projected into the air by hand for effective flight of a distance, and particularly relating to a casting card equipped with a concave or convex lens so that two of the cards can be placed in linear alignment with each other with the distance thereof varied to serve as a telescope for fun.

1 Claim, 4 Drawing Sheets

TOY CASTING CARD HAVING A CONCAVE OR CONVEX LENS

BACKGROUND OF THE INVENTION

The present invention relates to an improved toy casting card which can be better projected into the air by hand for effective flight of a distance, and particularly to a casting card equipped with a concave or convex lens so that two of the cards can be placed in linear alignment with each other with the distance thereof varied to serve as a telescope for fun.

Snacks for kids sold on supermarkets or convenience stores are provided with additional toys for promotion purpose. There have been various small toys designed and produced in the past years. The toy casting card was one of the promotional toys packed in candy or snack boxes or bags. The conventional casting card 10 is simply a round plate provided with a plurality of spaced joining recesses 11 on the periphery thereof and a securing cut 12. The joining recesses 11 permit several casting cards 10 to be connected to one another to produce various kinds of formations. The securing cut 12 permits the casting cards 10 to be engaged with other articles for flying a short distance when projected into the air. Such prior art casting cards can only be used to produce various formations and projected into the air for short flight. Kids easily lose their interest in the conventional casting cards.

SUMMARY OF THE INVENTION

Therefore, the primary object of the present invention is to provide an improved toy casting card which has a number of foldable peripheral extensions projected upwardly or downwardly so as to permit fingers to easily hold and apply force on the casting card to project the same into the air.

Another object of the present invention is to provide an improved toy casting card which is equipped with a convex or concave lens at the central portion thereof so that two casting cards having respectively a convex or concave lens can be put in linear alignment with each other with the distance therebetween randomly adjusted to serve as a telescope.

DETAILED DESCRIPTION OF THE PREFERRED EMBODIMENT

Figures 1, 2, 3:
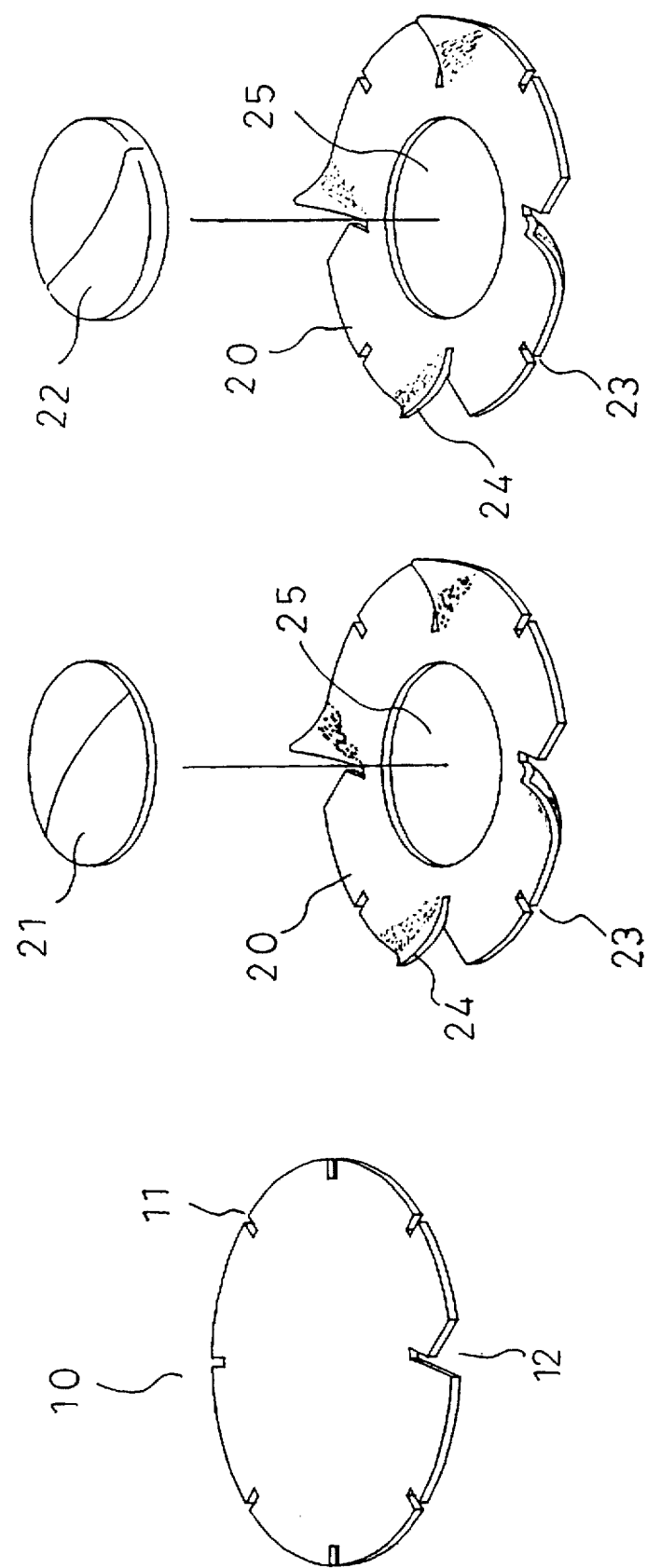
FIG. 1 is a diagram showing the structure of a conventional casting card.
FIG. 2 is a perspective diagram showing the exploded components of the present invention.
FIG. 3 is a perspective diagram showing the exploded components of another embodiment thereof.
Figure 5:
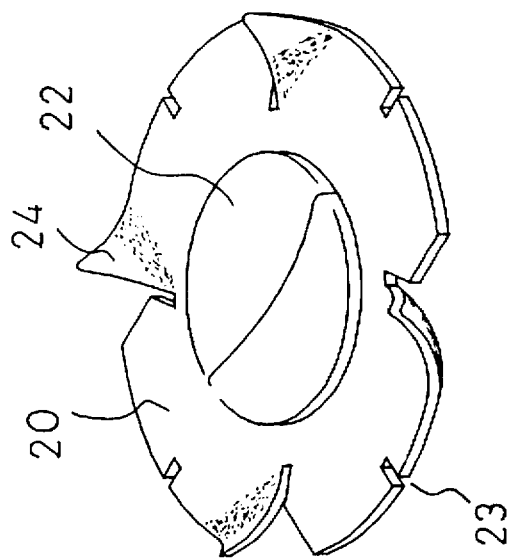
FIG. 5 is a perspective diagram showing the assembly of the second embodiment of FIG. 3.
Figure 4:
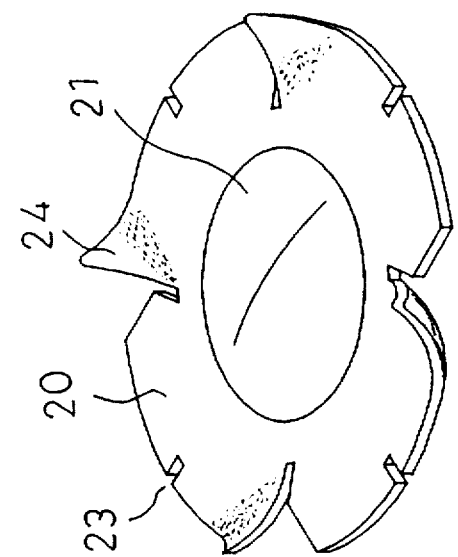
FIG. 4 is a perspective diagram showing the assembly of the first embodiment of FIG. 2.
Figure 7:
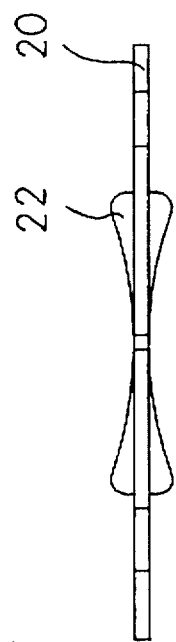
FIG. 7 is a side view of the assembly shown in FIG. 5.
Figure 6:
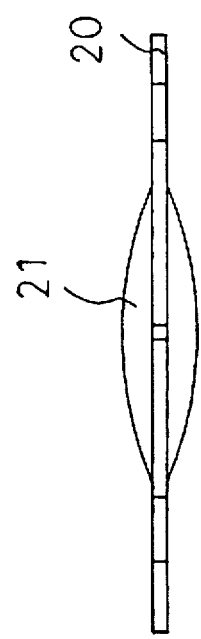
FIG. 6 is a side view of the assembly shown in FIG. 4.

Referring to the attached figures front FIG. 2 to FIG. 7, the improved toy casting card is made up of a card 20, a convex lens 21, or a concave lens 22. The card 20 is made in a donut shape with a central hole 25 defined thereon. A number of spaced joining recesses 23 are disposed on the periphery of the card 20 so as to permit multiple casting cards to be assembled in various formations. Between two joining recesses 23 is disposed a downwardly ( or upwardly ) bended skirt 24, projected smoothly from the card embodiment 20 so that a person can easily hold the casting card 20 and project the same readily with his or her fingers. The central hole 25 is provided for the mounting of the convex lens 21 or concave lens 22.

Figure 8:
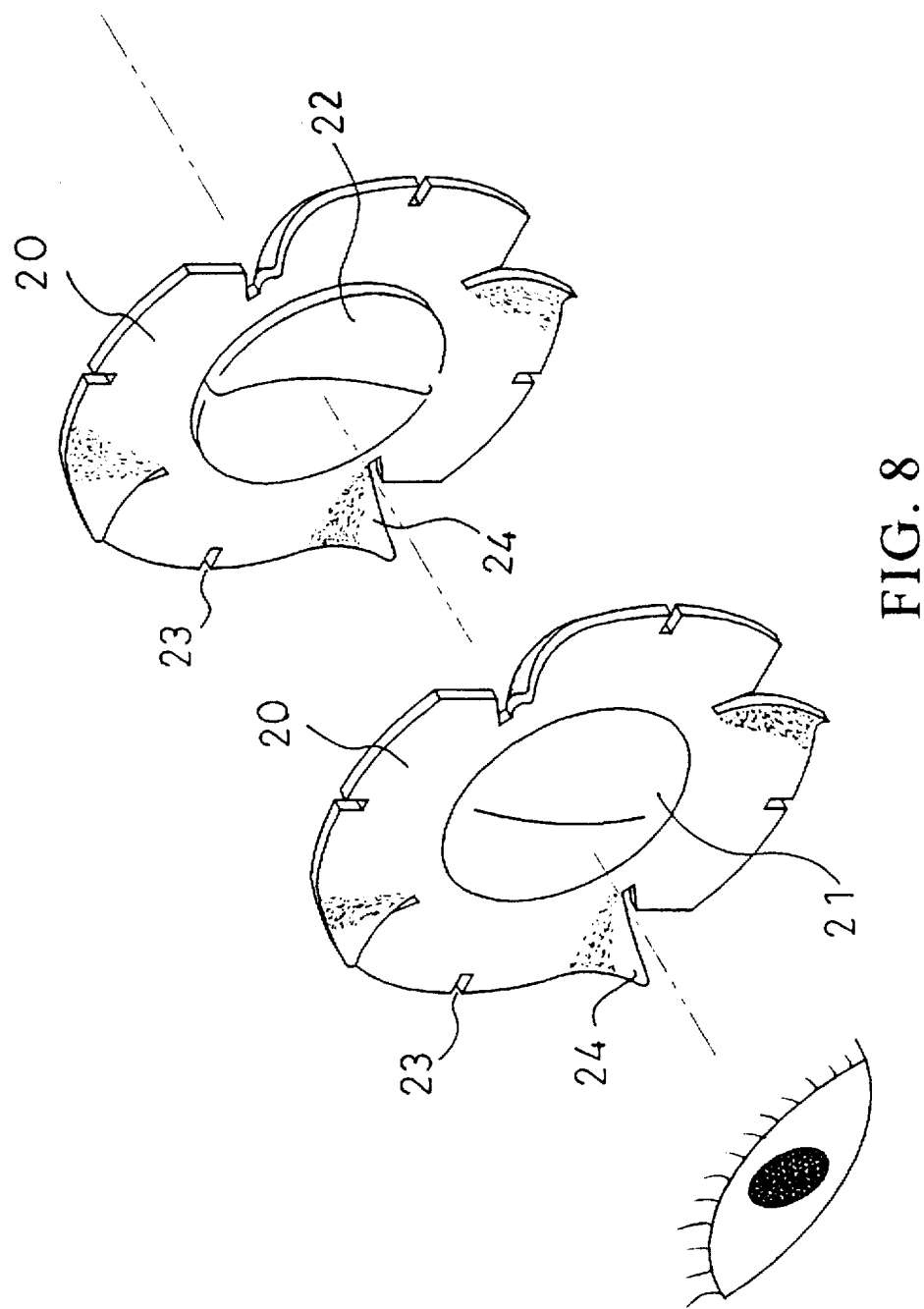
FIG. 8 is a diagram showing the practical application of the present invention.

Referring to FIG. 8, two casting cards 20 equipped with respectively a convex lens 21 and a concave lens 22 are placed in linear alignment with the distance therebetween randomly varied with the hands of a player moving towards or away from each other so as to serve as a telescope in practical use.

It can be clearly seen that the improved casting card of the present invention has the following advantages:

1. the casting card can be projected easily with the fingers of a player holding the bended skirts and making the casting cardfast spin.
2. the casting cards provided with convex and concave lens can be put together to serve as a telescope for fun.
3. the casting card is of a higher value to kids with the additional function.

I claim:

1. Improved toy casting cards comprising first and second cards, each having a periphery and a geometric center, each card having a through-hole at said geometric center, a convex lens located in said first card through-hole and a concave lens located in said second card through-hole, each of said cards having plural bent skirts on the periphery thereof in a smooth manner whereby said casting cards can be smoothly and readily projected into the air in one aspect and said cards can be placed in linear alignment in front of the eyes of a player with the distance between the cards being adjustable so as to serve as a telescope in another aspect.

* * * * *